US011126228B2

(12) United States Patent
Tang et al.

(10) Patent No.: US 11,126,228 B2
(45) Date of Patent: Sep. 21, 2021

(54) METHOD AND APPARATUS FOR DETERMINING INTERACTION POSITION

(71) Applicant: GUANGZHOU PUPPY ROBOTICS CO., LTD., Guangdong (CN)

(72) Inventors: Song Tang, Guangdong (CN); Dongfeng Lian, Guangdong (CN); Shaofeng Zang, Guangdong (CN)

(73) Assignee: GUANGZHOU PUPPY ROBOTICS CO., LTD.

( * ) Notice: Subject to any disclaimer, the term of this patent is extended or adjusted under 35 U.S.C. 154(b) by 91 days.

(21) Appl. No.: 16/605,171

(22) PCT Filed: Aug. 30, 2018

(86) PCT No.: PCT/CN2018/103197
§ 371 (c)(1),
(2) Date: Oct. 14, 2019

(87) PCT Pub. No.: WO2019/184240
PCT Pub. Date: Oct. 3, 2019

(65) Prior Publication Data
US 2021/0103315 A1    Apr. 8, 2021

(30) Foreign Application Priority Data
Mar. 29, 2018  (CN) .......................... 201810272858.1

(51) Int. Cl.
*G06F 3/038*    (2013.01)
*G06F 1/16*    (2006.01)
(Continued)

(52) U.S. Cl.
CPC ........... *G06F 1/1673* (2013.01); *G03B 21/26* (2013.01); *G06F 3/0489* (2013.01)

(58) Field of Classification Search
USPC .............. 345/168, 157, 167, 207, 158, 634; 715/730
See application file for complete search history.

(56) References Cited

U.S. PATENT DOCUMENTS

2011/0107222 A1* 5/2011 Uchida ................ H04N 9/3185
715/730
2012/0001848 A1* 1/2012 Lu ......................... G06F 3/0304
345/157
(Continued)

FOREIGN PATENT DOCUMENTS

CN    101539714 A    9/2009
CN    101571776        11/2009
(Continued)

OTHER PUBLICATIONS

Chinese Office Action issued in Corresponding Chinese Application. 201810272858.1 dated Mar. 27, 2020 with English translation.
(Continued)

*Primary Examiner* — Thuy N Pardo
(74) *Attorney, Agent, or Firm* — The Belles Group, P.C.

(57) ABSTRACT

A method and an apparatus for determining an interaction position. The method is applied to a projection interactive system. In the display direction of the projection plane, the light plane is formed above the projection plane via the predetermined light signal emitted by the light emitter, and the image pickup device can collect the predetermined light signal from the work region of the light plane. The predetermined light signal is monitored when the predetermined light signal collected by the image pickup device is obtained. As long as a person interacts with the projected image, the light plane for identifying the interaction position is inevitably penetrated, leading to the change of the predetermined light. The projection interactive system can recognize the signal change generated by the interacting action, and deter-
(Continued)

mine the interaction position of the interacting action according to the signal change.

19 Claims, 6 Drawing Sheets

(51) Int. Cl.
  *G03B 21/26* (2006.01)
  *G06F 3/0489* (2013.01)

(56) References Cited

U.S. PATENT DOCUMENTS

| | | | | |
|---|---|---|---|---|
| 2012/0313910 | A1* | 12/2012 | Haraguchi | G06F 3/0425 345/207 |
| 2013/0147711 | A1* | 6/2013 | Njolstad | G06F 3/011 345/158 |
| 2014/0256431 | A1* | 9/2014 | Pope | A63F 13/213 463/31 |
| 2015/0268812 | A1 | 9/2015 | Walline et al. | |
| 2015/0302626 | A1* | 10/2015 | Uchida | G06T 11/60 345/634 |
| 2017/0094293 | A1* | 3/2017 | Chou | H04N 19/157 |
| 2017/0103687 | A1* | 4/2017 | Ano | G09G 5/373 |
| 2017/0155847 | A1* | 6/2017 | Ito | G03B 21/147 |
| 2017/0285361 | A1* | 10/2017 | Ito | G02B 7/04 |
| 2017/0329458 | A1* | 11/2017 | Kanemaru | G06K 9/2036 |
| 2017/0351324 | A1* | 12/2017 | Njolstad | G06F 3/011 |
| 2018/0018014 | A1* | 1/2018 | Lutnick | G07F 17/32 |
| 2018/0054601 | A1* | 2/2018 | Tomono | H04N 9/3147 |
| 2018/0295400 | A1* | 10/2018 | Thomas | H04N 19/30 |
| 2019/0311514 | A1* | 10/2019 | Uchida | G06T 11/60 |
| 2020/0120779 | A1* | 4/2020 | Aggarwal | H05B 47/155 |
| 2020/0345307 | A1* | 11/2020 | Gray | A61B 5/6891 |

FOREIGN PATENT DOCUMENTS

| | | |
|---|---|---|
| CN | 101901108 A | 12/2010 |
| CN | 102866827 | 1/2013 |
| CN | 103024324 | 4/2013 |
| CN | 107102804 | 8/2017 |
| CN | 206672044 A | 11/2017 |
| JP | 2014126795 | 7/2014 |

OTHER PUBLICATIONS

International Search Report from PCT Application No. PCT/CN2018/103197 dated Jan. 7, 2019, pp. 1-9.

* cited by examiner

METHOD AND APPARATUS FOR DETERMINING INTERACTION POSITION

CROSS-REFERENCE TO RELATED PATENT APPLICATIONS

This application is the national phase of International Application No. PCT/CN2018/103197, titled "METHOD AND APPARATUS FOR DETERMINING INTERACTION POSITION", filed on Aug. 30, 2018, which claims the priority to Chinese Patent Application No. 201810272858.1, titled "METHOD AND APPARATUS FOR DETERMINING INTERACTION POSITION", filed on Mar. 29, 2018 with the China National Intellectual Property Administration, which is incorporated herein by reference in its entirety.

FIELD

The present disclosure relates to the field of image recognition, particularly to a method and an apparatus for determining an interaction position.

BACKGROUND

Human-computer interaction (Human-Computer Interaction) is a technique studying human, computers, and an interaction between the two. With development of human-computer interaction, a manner thereof has been widely applied in which human-computer interaction is based on a projected image. In the human-computer interaction based on the projected image, a projected image is formed on a projection plane by a projection device. There may be multiple interactive objects that can interact with a user in an interactive region. In a case an interacting action is performed on the interactive object by a user, the projection device can respond to the interacting action, for example, the projected image is moved.

Thereby, an interaction position is required to be determined in the human-computer interaction based on the projected image, so as to determine what the interactive object interacting with the user is, and respond to the user's interacting action on the interaction object. Conventionally, following steps are performed to recognize the interaction position. First, an interaction image between the user and the projected image is collected by an image capturing device. Then, the interaction image is processed through image recognition technology, to identify what part or what object the user uses for an interaction action. Afterwards, it is determined whether the user has performed the interacting action, according to the identified part or object for the interacting action. Finally, the interaction position can be determined.

Thereby, a lot of information is required to be identified through image processing technology in the conventional manner for determining the interaction position, for example, what part or what object the user uses for the interacting action, whether the user performs the interacting action, and determining the interaction position. It results in a lot of complicated image processing and a high pressure for processing. In a case that the interacting action is subtle or fast, the interacting action may not be recognized, and thereby the interaction position cannot be determined or is wrongly determined. As a result, there is no response or an erroneous response to the user's interacting action, and user experience is bad.

SUMMARY

To address the above issues, a method and an apparatus for determining an interaction position are provided according to the present disclosure. The interaction position can be accurately determined even in case of a subtle or fast interacting action. User experience is improved.

In a first aspect, a method for determining an interaction position is provided according to an embodiment of the present disclosure. The method is applied to a projection interactive system. The projection interactive system includes a projection device, an image pickup device, and a light emitter. The projection device is configured to project a projected image on a projection plane. The light emitter is configured to emit a predetermined light signal to form a light plane, where a work region of the light plane covers a first interactive region of the projected image in a direction in which the projected image is displayed, and the work region and the first interactive region do not intersect with each other. The image pickup device is configured to collect the predetermined light signal from the work region. The method includes:

obtaining the predetermined light signal collected by the image pickup device; and determining an interaction position of an interacting action according to a signal change generated by the interacting action, in response to the signal change being recognized based on the predetermined light signal.

Optionally, the method further includes:

generating a control instruction for the projected image based on the interaction position, such that the projection device changes the projected image in response to the control instruction.

Optionally, entirety or part of the projected image serves as the first interactive region.

Optionally, the work region is larger than the first interactive region, and a coverage region that is in the projection plane and covered by the work region further includes a second interactive region, where the second interactive region is located in a region in the coverage region, and the region is other than the first interactive region.

Optionally, determining the interaction position of the interacting action according to the signal change includes:

determining a position of the signal change in the work region, according to the signal change; and determining the interaction position of the interacting action, according to the position of the signal change and a corresponding relationship between the work region and the first interactive region.

Optionally, a direction in which the light emitter emits the predetermined light signal includes a direction identical to a projecting direction of the projection device, or a direction different from a projecting direction of the projection device.

Optionally, a minimum distance between the work region and the first interactive region is not less than a first preset threshold, and/or a maximum distance between the work region and the first interactive region is not greater than a second preset threshold.

Optionally, a waveband of the predetermined light signal is different from a waveband used by the projection device for a projected light signal, and a waveband collected by the image pickup device includes the waveband of the predetermined light signal.

Optionally, a waveband of the predetermined light signal is a waveband of an invisible light signal.

Optionally, in a case that the signal change recognized based on the predetermined light signal is generated by multiple interacting actions, determining the interaction position of the interacting action according to the signal change includes:

determining multiple interaction positions of the multiple interacting actions according to the signal change.

In a second aspect, an apparatus for determining an interaction position is provided by an embodiment of the present disclosure. The apparatus is applied to a projection interactive system. The projection interactive system includes a projection device, an image pickup device, and a light emitter. The projection device is configured to project a projected image on a projection plane. The light emitter is configured to emit a predetermined light signal to form a light plane, where a work region of the light plane covers a first interactive region of the projected image in a direction in which the projected image is displayed, and the work region and the first interactive region do not intersect with each other. The image pickup device is configured to collect the predetermined light signal from the work region. The apparatus includes an obtaining unit and a determination unit, where:

the obtaining unit is configured to obtain the predetermined light signal collected by the image pickup device; and the determination unit is configured to determine an interaction position of an interacting action according to a signal change generated by the interacting action, in response to the signal change being recognized based on the predetermined light signal.

Optionally, the apparatus further includes a generation unit, where:

the generation unit is configured to generate a control instruction for the projected image based on the interaction position, such that the projection device changes the projected image in response to the control instruction.

Optionally, entirety or part of the projected image serves as the first interactive region.

Optionally, the work region is larger than the first interactive region, and a coverage region that is in the projection plane and covered by the work region further includes a second interactive region, where the second interactive region is located in a region in the coverage region, and the region is other than the first interactive region.

Optionally, the determination unit is configured to: determine a position of the signal change in the work region, according to the signal change; and determine the interaction position of the interacting action, according to the position of the signal change and a corresponding relationship between the work region and the first interactive region.

Optionally, a direction in which the light emitter emits the predetermined light signal includes a direction identical to a projecting direction of the projection device, or a direction different from a projecting direction of the projection device.

Optionally, a minimum distance between the work region and the first interactive region is not less than a first preset threshold, and/or a maximum distance between the work region and the first interactive region is not greater than a second preset threshold.

Optionally, a waveband of the predetermined light signal is different from a waveband used by the projection device for a projected light signal, and a waveband collected by the image pickup device includes the waveband of the predetermined light signal.

Optionally, a waveband of the predetermined light signal is a waveband of an invisible light signal.

Optionally, in a case that the signal change recognized based on the predetermined light signal is generated by multiple interacting actions, the determination unit is configured to determine multiple interaction positions of the multiple interacting actions according to the signal change.

In a third aspect, a machine-readable medium is provided according to an embodiment of the present disclosure, storing instructions, where the instructions when executed by one or more processors configure an apparatus to perform one or more of the methods for determining the interaction position according to the first aspect.

According to the above technical solutions, in the display direction of the projection plane, the light plane is formed above the projection plane via the predetermined light signal emitted by the light emitter, and the image pickup device can collect the predetermined light signal from the work region of the light plane. Thereby, the predetermined light signal can be monitored when the predetermined light signal collected by the image pickup device is obtained. As long as a person interacts with the projected image, the light plane for identifying the interaction position is inevitably penetrated, leading to the change of the predetermined light. The projection interactive system can recognize the signal change generated by the interacting action, and determine the interaction position of the interacting action according to the signal change. Such technical solutions is saved from steps of identifying what part or what object the user uses for interaction and whether the user performs an interacting action, and hence it is only required to focus on recognizing the signal change generated by the interacting action to determine the interaction position. Therefore, such technical solutions do not need to perform complicated data processing in the conventional manners. The interaction position can be accurately determined even in case of a subtle or fast interacting action, and user experience is improved.

BRIEF DESCRIPTION OF THE DRAWINGS

For clearer illustration of the technical solutions according to embodiments of the present disclosure or conventional techniques, hereinafter are briefly described the drawings to be applied in embodiments of the present disclosure or conventional techniques. Apparently, the drawings in the following descriptions are only some embodiments of the present disclosure, and other drawings may be obtained by those skilled in the art based on the provided drawings without creative efforts.

DETAILED DESCRIPTION OF THE EMBODIMENTS

Hereinafter embodiments of the present disclosure are described in conjunction with drawings.

Applicant discovers in researches that a lot of information is required to be identified through image processing technology in the conventional manner for determining the interaction position, for example, what part or what object the user uses for the interacting action, whether the user performs the interacting action, and determining the interaction position. Hence, it results in a lot of complicated image processing and a high pressure for processing. In a case that the interacting action is subtle or fast, the interacting action may not be recognized, and thereby the interaction position cannot be determined or is wrongly determined. As a result, there is no response or an error response to the user's interacting action, and user experience is bad.

For example, a projected image is a keyboard. An interaction position is required to be determined for an interacting action that is performed by a user on the keyboard through a hand, so that a response is generated based on the determined interaction position. To achieve a typing function, a structure of the hand and a finger performing the interacting action on the keyboard are firstly required to be identified from an interaction image through image processing technology. When the user performs the interacting action on the keyboard for typing, all fingers are placed on the keyboard. Fingers that actually interacts with the keyboard changes subtly in comparison with fingers that are merely placed on the keyboard and do not interact with the keyboard. Thereby, it is required to use the image processing technology to recognize, according to a subtle change, which finger interacts with the keyboard and which finger is merely placed on the keyboard and does not interact with the keyboard. Only then is an interaction position of the finger that interacts with the keyboard determined, thereby achieving the typing function based on the interaction position.

Hence, it is difficult to recognize in the conventional manner for determining the interaction position, which finger placed on the keyboard is performing the interacting action, and which finger is merely placed on the keyboard. In addition, the interacting action between the hand and the keyboard is very fast when the hand interacts with the keyboard to achieve the typing function. A speed of image processing cannot meet the fast interacting action due to large amount of complicated image processing that is required, resulting in some unrecognizable interacting actions. Thereby, the interaction position cannot be determined or is wrongly determined, resulting in that no word is typed on the projected image due to zero response to the interacting action of the user, or a wrong word is typed on the projected image due to an erroneous response to the interacting action of the user. User experience is bad.

Figure 1A:
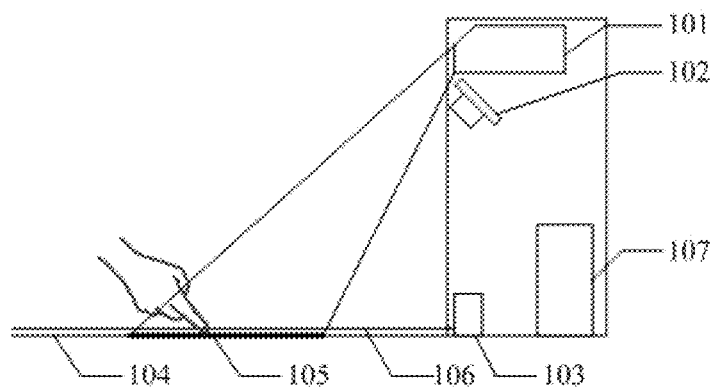
FIG. 1a is a structural diagram of a projection interactive system according to an embodiment of the present disclosure.

In view of the above, a method for determining an interaction position is provided by an embodiment of the present disclosure. The method may be applied to a projection interactive system as shown in FIG. 1a. The projection interactive system may include a projection device 101, an image pickup device 102, and a light emitter 103. The projection device 101 is configured to project a projected image on a projection plane 104. The projected image may include a first interactive region 105. The light emitter 103 is configured to emit a predetermined light signal to form a light plane 106. A work region of the light plane covers a first interactive region of the projected image in a direction in which the projected image is displayed, and the work region and the first interactive region 105 do not intersect with each other. The image pickup device 102 is configured to collect the predetermined light signal from the work region. It is appreciated that the projection interactive system may further include a processor 107. The processor 107 may process the collected light signal, so as to determine the interaction position and generate a corresponding control signal according to the determined interaction position. Thereby, the projection device 101 is controlled to change the projected image in response to the interacting action and interact with a user.

Figure 1B:
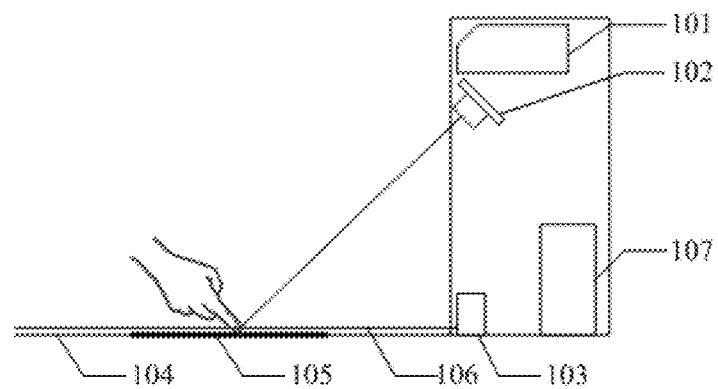
FIG. 1b is a schematic view of determining an interaction position for an interacting action according to an embodiment of the present disclosure.

A schematic view of determining the interaction position for the interacting action may be illustrated in FIG. 1b. There is a case in which a user taps an interaction position in the first interactive region 105 with a finger. The work region of the light plane 106 covers the first interactive region 105 of the projected image in the direction in which the projection plane 104 is displayed. Hence, the light plane for recognizing the interaction position is inevitably penetrated as long as the user interacts with the projected image. Thereby, the predetermined light signal is blocked, and a signal change for the interacting action is introduced, at a position at which the finger taps, into the predetermined light signal collected by the image pickup device 102. Thus, when the processor 107 obtains the predetermined light signal collected by the image pickup device 102, the interaction position of the interacting action can be determined according to the signal change in a case that the signal change generated by the interacting action is recognized. This technical solution is saved from steps of identifying what part or what object the user uses for interaction and whether the user performs an interacting action, and hence it is only required to focus on recognizing the signal change generated by the interacting action to determine the interaction position. Therefore, this technical solution does not need to perform complicated data processing in the conventional manners. The interaction position can be accurately determined even in case of a subtle or fast interacting action, and user experience is improved.

The work region according to one embodiment of the present application may refer to a region in the light plane that is configured to determine the interaction position. The work region is capable to generate the signal change for the user's interacting action, such that the interaction position can be determined according to the signal change. In the direction of displaying, the work region may cover an interactive region. Namely, the projection interactive system can display the projected image to the user for viewing, and the work region is closer to the user who views the projected image than the interactive region. Therefore, a body part or an object used by the user for the interacting action inevitably penetrates the work region, when the user interacts with the interactive region. The work region does not intersect with the interactive region.

The interactive region may refer to a region in which an interactive object is located on the projection plane. The interactive object may be a visible or invisible object. The user may interact with the projected image via the interactive object in the interactive region. For example, the interactive object may be each key on a keyboard. In such case, each key is a visible object, and a region in which the keyboard is located may serve the interactive region. The interactive region may include a region in which the projected image is located, for example, may be the first interactive region. The interactive region may further include a region that is located in the coverage region and is other than the first interactive region, for example, a second interactive region. The coverage region may refer to a region at which the work region covers the projection plane.

For another example, in a case that the projected image is a picture, there may be blank regions on left and right sides of the picture. The user may page up by interacting with the blank region on the left side, and page down by interacting with the blank region on the right side. In such case, the blank regions on the left and right sides may include the invisible object.

In one embodiment of the present application, the projection plane may be a plane or an analogue of a plane for displaying the projected image, such as a wall surface, a ceiling, a table surface, and a projection screen. Thereby, the projected image formed on the projection plane can be presented to the user from various directions.

Hereinafter how to determine the interaction position according an embodiment of the present disclosure is illustrated in conjunction with the drawings.

Figure 2:
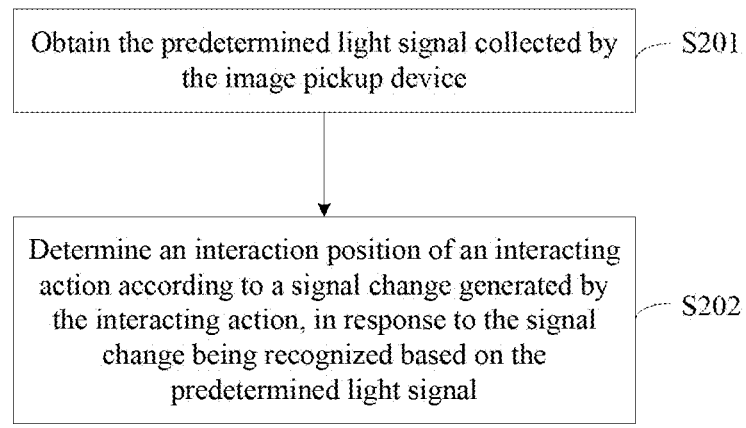
FIG. 2 is a flow chart of a method for determining an interaction position according to an embodiment of the present disclosure.

Shown FIG. 2 is a flow chart of a method for determining an interaction position according to an embodiment of the present disclosure. The method may be applied to a projection interactive system. The projection interactive system may include a projection device, an image pickup device, and a light emitter. The projection device is configured to project a projected image on a projection plane. The light emitter is configured to emit a predetermined light signal to form a light plane. A work region of the light plane covers a first interactive region of the projected image in a direction in which the projected image is displayed. The work region and the first interactive region do not intersect with each other. The image pickup device is configured to collect the predetermined light signal from the work region. The method includes steps S201 and S202.

In step S201, the predetermined light signal collected by the image pickup device is obtained.

The image pickup device is configured to collect the predetermined light signal from the work region. When the image pickup device collects the predetermined light signal from the work region, the processor as an example in the projection interactive system may obtain the predetermined light signal, so as to monitor the predetermined light signal. Thereby, it is recognized whether there is a signal change generated by the interacting action in the predetermined light signal.

A waveband of the predetermined light signal may be different from a waveband used by the projection device for a projected light signal, such that the waveband of the predetermined light signal can be collected by the image pickup device. Thereby, the image pickup device can distinguish the predetermined light signal from the projected light signal and collect the predetermined light signal. Since generally the projected light signal may be visible light, the waveband of the predetermined light signal may be a wavelength band of an invisible light signal.

It is appreciated that, in some cases, the waveband of the predetermined light signal may overlap with the waveband used by the projection device for the projected light signal. In such cases, the predetermined light signal may be distinguished from the predetermined light signal through a light processing technique, such that the image pickup device can obtain the wavelength band of the predetermined light signal.

Figure 3A:
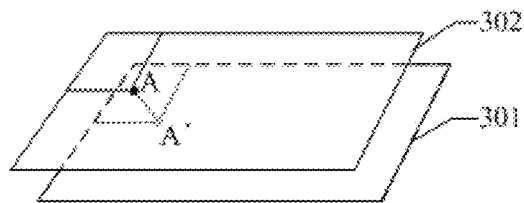
FIG. 3a is a schematic view of a positional relationship between a work region and a first interactive region according to an embodiment of the present disclosure.

In one embodiment, there may be a protrusion on the projection plane since the projection plane may not be a strictly flat surface. In a case that the protrusion can penetrate the light plane, the signal change is introduced into the predetermined light signal due to the protrusion penetrating the light plane, even if the user does not interact with the projected image. Although such signal change is not generated by the interacting action, there may be a signal change similar to that generated by the interacting action. In order to avoid interference to the predetermined light signal from an object such as the protrusion on the projection plane, the work region of the light plane covers the first interactive region of the projected image and does not intersect with the first interactive region. A positional relationship between the work region and the first interactive region may be as illustrated in FIG. 3a. 301 is the first interactive region, and 302 is the work region.

Figure 3B:
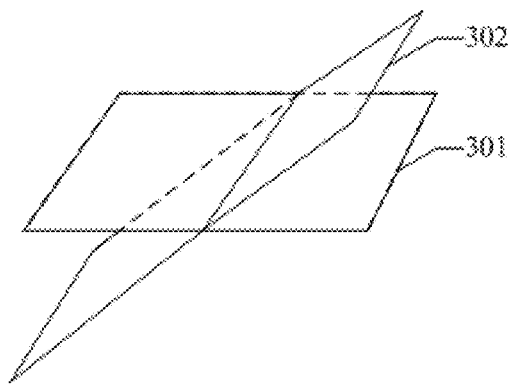
FIG. 3b is a schematic view of a positional relationship between a work region and a first interactive region according to an embodiment of the present disclosure.

It is assumed that the work region 302 intersects with the first interactive region 301 as illustrated in FIG. 3b. It can be seen that the intersection of the work region 302 and the first interactive region 301 may result in an erroneous signal change due to that the protrusion on the projection plane interferences with the predetermined light signal. Besides, the work region 302 may be located below the first interactive region 301 in the direction of displaying due to the intersection. As a result, the work region 302 located below the first interactive region 301 is incapable to be penetrated even if the user performs the interacting action, thereby failing to recognize the action of the user.

Figure 3C:
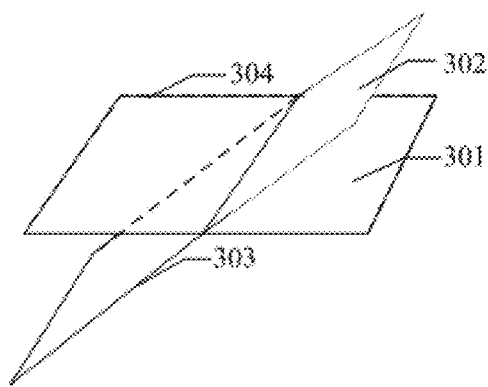
FIG. 3c is a schematic view of a positional relationship between a work region and a first interactive region according to an embodiment of the present disclosure.

It should be noted that the work region merely does not intersect with the interactive region that includes the first interactive region in this embodiment, and the light plane in which the work region is located may intersect with the projection plane in which the interactive region is located. As an example illustrated in FIG. 3c, the projection plane 304 intersects with the light plane 303. The work region 302 is only a region, indicated by a dashed frame, included in the light plane 303, and the first interactive region 301 is only a right portion of the projection plane 304. In such case, it is still guaranteed that the work region 302 does not intersect with the first interactive region 301.

Therefore, it is a key of this embodiment that the work region of the light plane is ensured to cover the first interactive region of the projected image, and the work region is ensured not to intersect with the first interactive region. The signal generated by the interacting action can be accurately obtained, and then the interaction position can be accurately determined.

It should be noted that the first interactive region may be entirety or part of the projected image. As an example illustrated in FIG. 4a, the projected image presented to the user is required to be changed by a sliding operation of the user on the projected image in some situations. In these cases, the entire projected image may serve as the first interactive region.

Figure 4A:
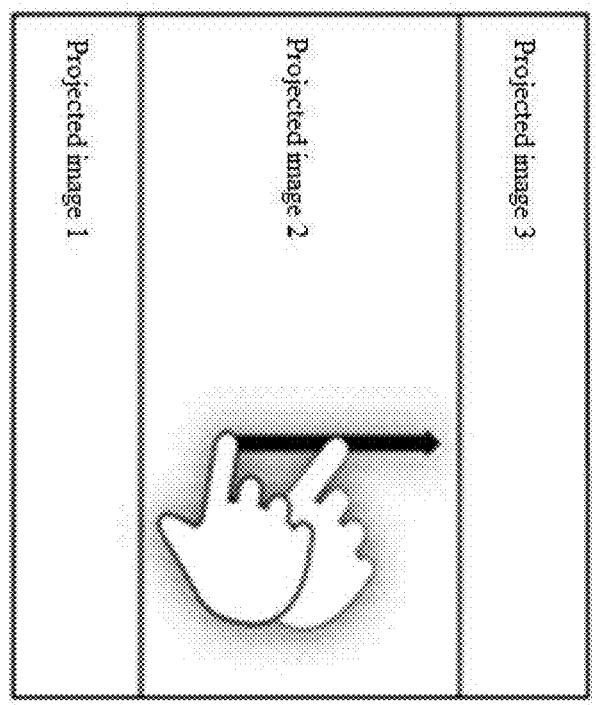
FIG. 4a is a schematic view of a first interactive region according to an embodiment of the present disclosure.

It is assumed that a projected image 2 is currently illustrated in FIG. 4a, and the user wishes to change the projected image 2 to a projected image 1. The user can slide at any position of the projected image 2, to change the projected image 2 presented to the user to the projected image 1.

Figure 4B:
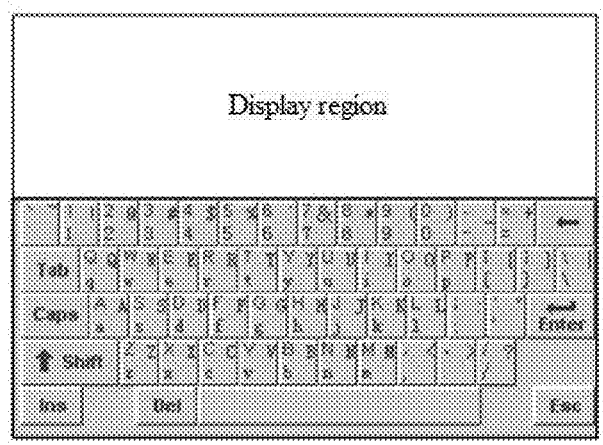
FIG. 4b is a schematic view of a first interactive region according to an embodiment of the present disclosure.

As another example illustrated in FIG. 4b, the projected image includes a display-screen portion for displaying an image, and a keyboard portion for inputting a text on the display screen according to the interacting action of the user. In such case, the user only needs to interact with the keyboard on the projected image so as to display the inputted text on the display screen. Thus, a portion of the projected image may serve as a display region, such as an upper region in FIG. 4b, and another portion may serve as the first interactive region, such as a lower region in FIG. 4b.

In step S202, an interaction position of the interacting action is determined according to a signal change generated by the interacting action, in response to the signal change being recognized based on the predetermined light signal.

In a case that the signal change generated by the interacting action is recognized in the predetermined light signal, the interaction position of the interacting action may be determined according to the signal change, so as to facilitate generating a control instruction for the projected image based on the interaction position. For example, the control instruction is for moving the projected image.

In one embodiment, since the work region covers the first interactive region of the projected image, there is a corresponding relationship between the work region and the first interactive region. As an example illustrated in FIG. 3a, a position A in the work region and a position A' in the first interactive region corresponds to each other. Namely, in a case that the position A in the work region is determined, the position A' in the first interactive region can be determined based on the position A and the corresponding relationship between the position A and the position A'.

Therefore, in one embodiment, an implementation for determining the interaction position of the interacting action according to the signal change may include following steps. The position of the signal change in the work region is determined according to the signal change. The interaction position of the interacting action is determined according to the position of the signal change and the corresponding relationship between the work region and the first interactive region.

For example, in a case the user uses a finger to penetrate the position A of the work region and performs an interacting action at the interaction position A' in the first interactive region in FIG. 3a, the finger penetrating the position A blocks the light plane formed by the predetermined light signal. Thereby, there is the signal change in the predetermined light signal. The position A of the signal change can be determined based on the signal change, and the interaction position A' in the first interactive region can be determined based on the position A and the corresponding relationship between the position A and the interaction position A'.

After determining the interaction position of the interacting action, the control instruction for the projected image can be generated based on the interaction position. Thereby, the projection device changes the projected image in response to the control instruction.

According to the above technical solutions, in the display direction of the projection plane, the light plane is formed above the projection plane via the predetermined light signal emitted by the light emitter, and the image pickup device can collect the predetermined light signal from the work region of the light plane. Thereby, the predetermined light signal can be monitored when the predetermined light signal collected by the image pickup device is obtained. As long as a person interacts with the projected image, the light plane for identification is inevitably penetrated, leading to the change of the predetermined light. The projection interactive system can recognize the signal change generated by the interacting action, and determine the interaction position of the interacting action according to the signal change. Such technical solutions is saved from steps of identifying what part or what object the user uses for interaction and whether the user performs an interacting action, and hence it is only required to focus on recognizing the signal change generated by the interacting action to determine the interaction position. Therefore, such technical solutions do not need to perform complicated data processing in the conventional manners. The interaction position can be accurately determined even in case of a subtle or fast interacting action, and user experience is improved.

It should be noted that although the work region covers the first interactive region and does not intersect with the first interactive region, there may be a distinct protrusion in the first interactive region in some situations. Hence, besides the work region and the first interactive region do not intersect with each other, a distance between the two is required to be larger than a maximum height of the protrusion. Thereby, it is better ensured that the predetermined light signal in the work region is not affected by the protrusion, and it is prevented that a signal change caused by the protrusion is erroneously recognized as the signal change generated by the interacting action. Therefore, a minimum distance between the work region and the first interactive region is not less than a first preset threshold. The first preset threshold may be set according to a characteristic of the projection plane, such as a height of the protrusion.

The distance between the work region and the first interactive region may be large in some situations. In such case, the user may be required to place the hand high from the work region, in order to prevent the a part (such as a hand) of the user, or the object required to be used by the user for the interacting action, from accidentally touching the work region to result in an unnecessary signal change and make the projection device wrongly respond before the user interacts with the projected image. It results in bad user experience. Therefore, a maximum distance between the work region and the first interactive region is not greater than a second preset threshold. The second preset threshold may be set according to the user experience.

It is appreciated that the distance between the work region and the first interactive region may be set to be moderate, in order to meet both the characteristic of the projection plane and the user experience. Namely, the minimum distance between the work region and the first interactive region is not less than the first preset threshold, and the maximum distance between the work region and the first interactive region is not greater than the second preset threshold.

In one embodiment, an area of the work region may be equal to or larger than an area of the first interactive region, in order to ensure that the work region covers the first interactive region of the projected image. In some situations, the area of the work region may be larger than the area of the first interactive region. Hence, the work region can cover both the first interactive region and a region of the projection plane other than the first interactive region. An objective is to ensure that the interaction position can be determined according to the signal change when a part of the user or an object used by the user penetrates any position of the work region, and the projected image can be changed based on the interaction position. In order to achieve such objective, the coverage region that is in the projection plane and covered by the work region further includes a second interactive region, in a case that the work region is larger than the first interaction. The second interactive region may be located in a region that is in the coverage region and other than the first interactive region.

Figure 5A:
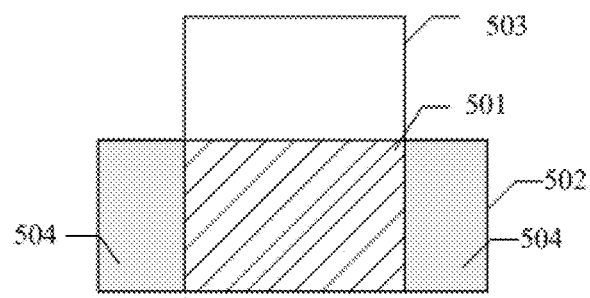
FIG. 5a is a schematic view of a second interactive region according to an embodiment of the present disclosure.

Shown in FIG. 5a is an introduction of the second interactive region, where it is taken as an example that a part of the projected image 503 serves the first interactive region. In FIG. 5a, the first interactive region 501 may be a shaded portion as illustrated in FIG. 5a, and the work region is illustrated as 502 in FIG. 5a. It can be seen that an area of the work region 502 is larger than an area of the first interactive region 501. Namely, the coverage region that is in the projection plane and covered by the work region 502 includes the first interactive region 501, and further includes gray regions on left and right sides of the first interactive region 501, as illustrated as 504 in FIG. 5a. Such regions may serve the second interactive region. In a case that the user interacts with the second interactive region, the projection interactive system may also perform the steps illustrated in S201 and S202, so as to generate the control instruction to change the projected image.

Figure 5B:
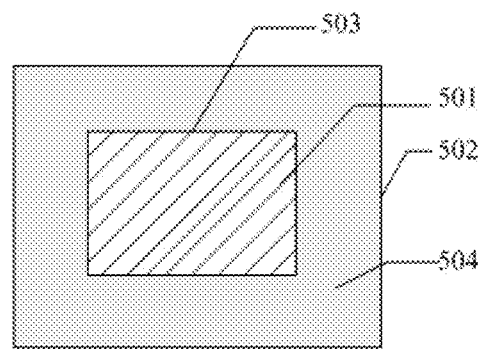
FIG. 5b is a schematic view of a second interactive region according to an embodiment of the present disclosure.

Shown in FIG. 5b is an introduction of the second interactive region, where it is taken as an example that entirety of the projected image 503 serves the first interactive region. In such case, the first interactive region 501 is illustrated as a shaded portion in FIG. 5b, and the work region is illustrated as 502 in FIG. 5b. It can be seen that an area of the work region 502 is larger than an area of the first interactive region 501. Namely, the coverage region that is in the projection plane and covered by the work region 502 includes the first interactive region 501, and further includes a gray region around the first interactive region 501, as illustrated as 504 in FIG. 5b. Such region may serve the second interaction. In a case that the user interacts with the second interactive region, the projection interactive system may also perform the steps illustrated in S201 and S202, so as to generate the control instruction to change the projected image.

It can be understood that a direction in which the light emitter emits the predetermined light signal may include various directions in space, as long as it is ensured that the work region covers the first interactive region of the projected image and the work region does not intersect with the first interactive region. Therefore, the direction in which the light emitter emits the predetermined light signal may include a direction identical to a projecting direction of the projection device. As an example illustrated in FIG. 1a, the light emitter is on a same side as the projection device, and the light emitter is integrated with the projection device to form the projection interactive system.

Figure 6:
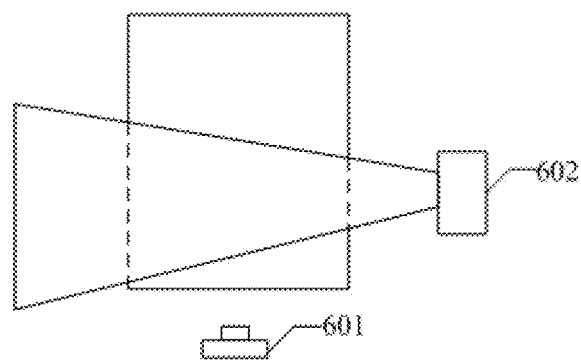
FIG. 6 is a schematic view of a position of a light emitter in a projection system according to an embodiment of the present disclosure.

Additionally, the direction in which the light emitter emits the predetermined light signal may include a direction different from the projecting direction of the projection device. As an example illustrated in FIG. 6, the light emitter is not integrated with the projection device, and is independently arranged. A position of the projection device may be illustrated as 601, and the projecting direction thereof may be upward. A position of the light emitter may be illustrated as 602, and the direction in which the predetermined light signal is emitted may be leftward. In such case, the work region formed by the light emitter emitting the predetermined light signal may still cover the first interactive region, and the work region does not intersect with the first interactive region. Of course, another different direction such as a direction opposite to the projecting direction of the projection device may also be included.

In some situations, such as the user performing the interacting action with the projected image by using a finger and wishing to slide the projected image, multiple fingers such as two fingers may be used by the user. In such case, although two interacting actions are used by the two fingers working together to achieve the interactive effect of sliding projection image, the interaction positions of the two fingers on the first interactive region may be different. It is required to determine the interaction positions that correspond to the two fingers respectively.

In such case, the signal change generated by multiple interacting actions is required to be recognized by the projection interactive system according to the predetermined light signal. Then, multiple interaction positions of the multiple interacting actions are determined according to the signal change. Thereby, the control instruction can be generated based on the multiple interaction positions, to jointly achieve the change of the projected image.

Based on the method for determining the interaction position as provided above, an apparatus for determining an interaction position is provided according to an embodiment of the present disclosure. The apparatus is applied to a projection interactive system. The projection interactive system includes a projection device, an image pickup device, and a light emitter. The projection device is configured to project a projected image on a projection plane. The light emitter is configured to emit a predetermined light signal to form a light plane. A work region of the light plane covers a first interactive region of the projected image in a direction in which the projected image is displayed. The work region and the first interactive region do not intersect with each other. The image pickup device is configured to collect the predetermined light signal from the work region.

Figure 7:
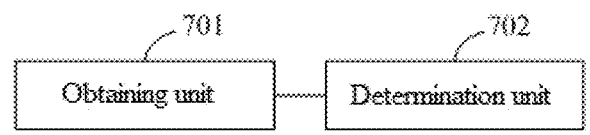
FIG. 7 is a structural diagram of an apparatus for determining an interaction position according to an embodiment of the present disclosure.

Reference is made to FIG. 7, which is a structural diagram of an apparatus for determining an interaction position. The apparatus includes an obtaining unit 701 and a determination unit 702.

The obtaining unit 701 is configured to obtain the predetermined light signal collected by the image pickup device.

The determination unit 702 is configured to determine an interaction position of an interacting action according to a signal change generated by the interacting action, in response to the signal change being recognized based on the predetermined light signal.

Optically, the apparatus may further include a generation unit.

The generation unit is configured to generate a control instruction for the projected image based on the interaction position, such that the projection device changes the projected image in response to the control instruction.

Optionally, entirety or part of the projected image serves as the first interactive region.

Optionally, the work region is larger than the first interactive region, and a coverage region that is in the projection plane and covered by the work region further includes a second interactive region. The second interactive region is located in a region in the coverage region, and the region is other than the first interactive region.

Optionally, the determination unit 702 is configured to: determine a position of the signal change in the work region, according to the signal change; and determine the interaction position of the interacting action, according to the position of the signal change and a corresponding relationship between the work region and the first interactive region.

Optionally, a direction in which the light emitter emits the predetermined light signal includes a direction identical to a projecting direction of the projection device, or a direction different from a projecting direction of the projection device.

Optionally, a minimum distance between the work region and the first interactive region is not less than a first preset threshold, and/or a maximum distance between the work region and the first interactive region is not greater than a second preset threshold.

Optionally, a waveband of the predetermined light signal is different from a waveband used by the projection device for a projected light signal, and a waveband collected by the image pickup device includes the waveband of the predetermined light signal.

Optionally, a waveband of the predetermined light signal is a waveband of an invisible light signal.

Optionally, in a case that the signal change recognized based on the predetermined light signal is generated by multiple interacting actions, the determination unit 702 is configured to determine multiple interaction positions of the multiple interacting actions according to the signal change.

According to the above technical solutions, in the display direction of the projection plane, the light plane is formed above the projection plane via the predetermined light signal emitted by the light emitter, and the image pickup device can collect the predetermined light signal from the work region of the light plane. Thereby, the predetermined light signal can be monitored when the obtaining unit obtains the predetermined light signal collected by the image pickup device. As long as a person interacts with the projected image, the light plane for identifying the interaction position is inevitably penetrated, leading to the change of the predetermined light. In a case that the signal change generated by the interacting action can be recognized, the determination unit can determine the interaction position of the interacting action according to the signal change. Such technical solutions is saved from steps of identifying what part or what object the user uses for interaction and whether the user performs an interacting action, and hence it is only required to focus on recognizing the signal change generated by the interacting action to determine the interaction position. Therefore, such technical solutions do not need to perform complicated data processing in the conventional manners. The interaction position can be accurately determined even in case of a subtle or fast interacting action, and user experience is improved.

Based on the method and the apparatus for determining the interaction position provided by the above embodiments, a machine readable medium storing instructions is provided according to an embodiment of the present disclosure. The instructions when executed by one or more processors configure an apparatus to perform one or more of the method for determining the interaction position.

A device for determining an interaction position is further provided according to an embodiment of the present disclosure. The device for determining the interaction position may include the aforementioned apparatus for determining the interaction position. The device for determining the interaction position is applied to a projection interactive system. The projection interactive system includes a projection device, an image pickup device, and a light emitter. The projection device is configured to project a projected image on a projection plane. The light emitter is configured to emit a predetermined light signal to form a light plane. A work region of the light plane covers a first interactive region of the projected image in a direction in which the projected image is displayed. The work region and the first interactive region do not intersect with each other. The image pickup device is configured to collect the predetermined light signal from the work region.

Figure 8:
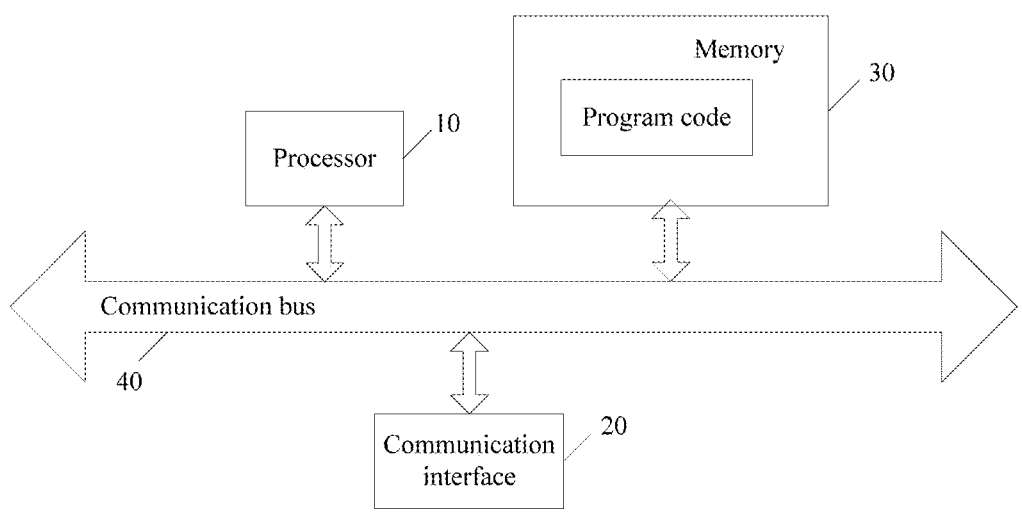
FIG. 8 is a structural diagram of hardware of a device for determining an interaction location according to an embodiment of the present disclosure.

Optionally, FIG. 8 illustrates a structural diagram of hardware of a server. Referring to FIG. 8, the device for determining an interaction position may include a processor 10, a communication interface 20, a memory 30, and a communication bus 40.

The processor 10, the communication interface 20, and the memory 30 communicate with each other via the communication bus 40.

Optionally, the communication interface 20 may be an interface of a communication module, such as an interface of a GSM module.

The processor 10 may be a central processing unit CPU, or an application specific integrated circuit ASIC (Application Specific Integrated Circuit), or one or more integrated circuits configured to implement one embodiment of the present application.

The memory 30 may include a high speed RAM memory, and may also include a non-volatile memory (non-volatile memory), such as at least one magnetic disk memory.

The processor 10 is specifically configured to perform following operations.

The predetermined light signal collected by the image pickup device is obtained.

An interaction position of an interacting action is determined according to a signal change generated by the interacting action, in response to the signal change being recognized based on the predetermined light signal.

A storage medium is further provided according to an embodiment of the present disclosure. The storage medium is configured to store a program code. The program code is configured to perform the method for determining the interaction position according to the foregoing embodiments.

A computer program product including instructions is further provided according to an embodiment of the present disclosure. The product when executed on a server configures the server to perform the method for determining the interaction position according to the foregoing embodiments.

It can be understood by those skilled in the art that all or part of the steps for implementing the foregoing method embodiments may be performed via hardware related to program instructions. The foregoing program may be stored in a computer readable storage medium. The foregoing steps of the method embodiment are performed when the program is executed. The foregoing storage medium may be at least one of the following mediums for storing the program code: a read-only memory (read-only memory in English, abbreviated as ROM), a RAM, a magnetic disk, or an optical disk.

The embodiments of the present disclosure are described in a progressive manner, and each embodiment places emphasis on the difference from other embodiments. Therefore, one embodiment can refer to other embodiments for the same or similar parts. In particular, the device embodiments and the system embodiments are similar to the method embodiments, the description of the device embodiments and the system embodiments is simple, and reference may be made to the relevant part of the method embodiments. The device embodiments and the system embodiments described above are merely illustrative. The unit described as separate parts may be or may not be physically separate, and the part displayed as a unit may be or may not be physical. They may be located in one position, or may be distributed among multiple network units. Part or all of the modules may be selected according to actual requirements to achieve the objective of the solutions of the embodiments. Those skilled in the art can understand and implement without any creative effort.

Described above is merely a specific embodiment of the present disclosure, and the protection scope of the present disclosure is not limited thereto. Any variations or replacement that can be easily made by those skilled in the art within the technical scope disclosed in the present disclosure should fall within the protection scope of the present disclosure. Therefore, the protection scope of the present disclosure should be subject to the protection scope of the claims.

The invention claimed is:

1. A method for determining an interaction position, applied to a projection interactive system, wherein:
the projection interactive system comprises a projection device, an image pickup device, and a light emitter;
the projection device is configured to project a projected image on a projection plane;
the light emitter is configured to emit a predetermined light signal to form a light plane, wherein a work region of the light plane covers a first interactive region of the projected image in a direction in which the projected image is displayed, and the work region and the first interactive region do not intersect with each other;
the image pickup device is configured to collect the predetermined light signal from the work region;
a minimum distance between the work region and the first interactive region is not less than a first preset threshold, and the first preset threshold is set according to a height of a protrusion on the projection plane, and the protrusion is located in the first interactive region; and
the method comprises:
obtaining the predetermined light signal collected by the image pickup device; and
determining an interaction position of an interacting action according to a signal change generated by the interacting action, in response to the signal change being recognized based on the predetermined light signal.

2. The method according to claim 1, further comprising:
generating a control instruction for the projected image based on the interaction position, such that the projection device changes the projected image in response to the control instruction.

3. The method according to claim 1, wherein entirety or part of the projected image serves as the first interactive region.

4. The method according to claim 1, wherein:
the work region is larger than the first interactive region;
a coverage region that is in the projection plane and covered by the work region further comprises a second interactive region; and
the second interactive region is located out of the projected image, and comprises invisible objects for a user interacting with the projected image.

5. The method according to claim 1, wherein determining the interaction position of the interacting action according to the signal change comprises:
determining a position of the signal change in the work region, according to the signal change; and
determining the interaction position of the interacting action, according to the position of the signal change and a corresponding relationship between the work region and the first interactive region.

6. The method according to claim 1, wherein a direction in which the light emitter emits the predetermined light signal comprises a direction identical to a projecting direction of the projection device, or a direction different from a projecting direction of the projection device.

7. The method according to claim 1, wherein a waveband of the predetermined light signal is a waveband of an invisible light signal.

8. The method according to claim 1, wherein the signal change recognized based on the predetermined light signal is generated by a plurality of interacting actions, and determining the interaction position of the interacting action according to the signal change comprises:
determining a plurality of interaction positions of the plurality of interacting actions according to the signal change.

9. A machine readable medium, storing instructions, wherein:
the instructions when executed by one or more processors configure an apparatus to perform the method for determining the interaction position according to claim 1.

10. A computer program product, comprising instructions, wherein:
the computer program produce when running on a computer configures the computer to perform the method for determining the interaction position according to claim 1.

11. An apparatus for determining an interaction position, applied to a projection interactive system, wherein:
the projection interactive system comprises a projection device, an image pickup device, and a light emitter;
the projection device is configured to project a projected image on a projection plane;
the light emitter is configured to emit a predetermined light signal to form a light plane, wherein a work region of the light plane covers a first interactive region of the projected image in a direction in which the projected image is displayed, and the work region and the first interactive region do not intersect with each other;
the image pickup device is configured to collect the predetermined light signal from the work region;
a minimum distance between the work region and the first interactive region is not less than a first preset threshold, and the first preset threshold is set according to a height of a protrusion on the projection plane, and the protrusion is located in the first interactive region; and
the apparatus comprises:
an obtaining unit, configured to obtain the predetermined light signal collected by the image pickup device; and
an determination unit, configured to determine an interaction position of an interacting action according to a signal change generated by the interacting action, in response to the signal change being recognized based on the predetermined light signal.

12. The apparatus according to claim 11, further comprising:
a generation unit, configured to generate a control instruction for the projected image based on the interaction position, such that the projection device changes the projected image in response to the control instruction.

13. The apparatus according to claim 11, wherein entirety or part of the projected image serves as the first interactive region.

14. The apparatus according to claim 11, wherein:
the work region is larger than the first interactive region;
a coverage region that is in the projection plane and covered by the work region further comprises a second interactive region; and the second interactive region is located out of the projected image, and comprises invisible objects for a user interacting with the projected image.

15. The apparatus according to claim 11, wherein the determination unit is configured to:
   determine a position of the signal change in the work region, according to the signal change; and
   determine the interaction position of the interacting action, according to the position of the signal change and a corresponding relationship between the work region and the first interactive region.

16. The apparatus according to claim 11, wherein a direction in which the light emitter emits the predetermined light signal comprises a direction identical to a projecting direction of the projection device, or a direction different from a projecting direction of the projection device.

17. The apparatus according to claim 11, wherein a waveband of the predetermined light signal is a waveband of an invisible light signal.

18. The apparatus according to claim 11, wherein in a case that the signal change recognized based on the predetermined light signal is generated by a plurality of interacting actions, and the determination unit is configured to determine a plurality of interaction positions of the plurality of interacting actions according to the signal change.

19. A device for determining an interaction position, applied to a projection interactive system, wherein:
   the projection interactive system comprises a projection device, an image pickup device, and a light emitter;
   the projection device is configured to project a projected image on a projection plane;
   the light emitter is configured to emit a predetermined light signal to form a light plane, wherein a work region of the light plane covers a first interactive region of the projected image in a direction in which the projected image is displayed, and the work region and the first interactive region do not intersect with each other;
   the image pickup device is configured to collect the predetermined light signal from the work region; and
   the device for determining an interaction position comprises a processor, a communication interface, a memory, and a communication bus;
   wherein:
   the processor, the communication interface, and the memory communicates with each other via the communication bus;
   the communication interface is an interface of a communication module;
   the memory is configured to store a program code and transmit the program code to the processor; and
   the processor is configured to call an instruction of the program code in the memory, to perform:
   obtaining the predetermined light signal collected by the image pickup device; and
   determining an interaction position of an interacting action according to a signal change generated by the interacting action, in response to the signal change being recognized based on the predetermined light signal.

* * * * *